(12) United States Patent
Jeon et al.

(10) Patent No.: US 10,217,203 B2
(45) Date of Patent: Feb. 26, 2019

(54) IMAGE SYNTHESIS METHOD AND SYSTEM (71) Applicant: STARSHIP VENDING-MACHINE CORP., Seoul (KR)

(72) Inventors: Su-young Jeon, Seoul (KR); Ji-yong Kwon, Seoul (KR)

(73) Assignee: STARSHIP VENDING-MACHINE CORP., Seoul (KR)

( * ) Notice: Subject to any disclaimer, the term of this patent is extended or adjusted under 35 U.S.C. 154(b) by 56 days.

(21) Appl. No.: 15/624,662

(22) Filed: Jun. 15, 2017

(65) Prior Publication Data
US 2017/0309006 A1 Oct. 26, 2017

Related U.S. Application Data (63) Continuation of application No. PCT/KR2015/013722, filed on Dec. 15, 2015.

(30) Foreign Application Priority Data

Dec. 17, 2014 (KR) .................. 10-2014-0182562

(51) Int. Cl.
*G06K 9/00* (2006.01)
*G06T 5/50* (2006.01)
*G06T 11/60* (2006.01)
*G06T 5/00* (2006.01)
*G06T 7/90* (2017.01)
*G06T 7/194* (2017.01)

(52) U.S. Cl.
CPC ............... *G06T 5/50* (2013.01); *G06T 5/001* (2013.01); *G06T 7/194* (2017.01); *G06T 7/90* (2017.01); *G06T 11/60* (2013.01); *G06T 2207/10024* (2013.01); *G06T 2207/20076* (2013.01); *G06T 2207/20221* (2013.01)

(58) Field of Classification Search
USPC ........................................................ 382/167
See application file for complete search history.

(56) References Cited

U.S. PATENT DOCUMENTS

| 2003/0164875 A1* | 9/2003 | Myers ................. H04N 13/026 348/52 |
| 2015/0117717 A1* | 4/2015 | Cho .................... G06K 9/00201 382/106 |

(Continued)

*Primary Examiner* — Jerome Grant, II
(74) *Attorney, Agent, or Firm* — KORUS Patent, LLC; Seong Il Jeong (57) ABSTRACT

The present invention relates to a method and system for image synthesis. According to a first aspect of the present invention, an image synthesis system for providing a method for image synthesis may include: a first foreground unit configured to receive a predetermined region that is selected from a source image, including an object, as a first foreground by a user; a similarity determination unit configured to calculate the similarity between each of the first foreground and the background distinct from the first foreground on the source image and each pixel included in the source image; a second foreground unit configured to determine a second foreground, including the remaining pixels excluding pixels, included in each of the first foreground and the background, from the source image, based on the calculated similarity; and an image synthesis unit configured to combine the first foreground and the second foreground with a ground image.

14 Claims, 2 Drawing Sheets

(56) References Cited

U.S. PATENT DOCUMENTS

| | | | |
|---|---|---|---|
| 2015/0235374 A1* | 8/2015 | Wang | G06T 7/0081 |
| | | | 382/160 |
| 2016/0004929 A1* | 1/2016 | Varghese | G06K 9/00771 |
| | | | 382/103 |
| 2016/0163059 A1* | 6/2016 | Xie | G06T 7/11 |
| | | | 382/173 |
| 2017/0011528 A1* | 1/2017 | Urban | G06T 7/0081 |
| 2017/0358094 A1* | 12/2017 | Sun | G06T 7/11 |
| 2018/0220048 A1* | 8/2018 | Tamir | H04N 13/257 |

* cited by examiner

FIG. 3

IMAGE SYNTHESIS METHOD AND SYSTEM

TECHNICAL FIELD

The present invention relates generally to an image synthesis method and system, and more particularly to an image synthesis method and apparatus that perform color correction on pixels at the same locations between a source frame and a target frame included in a source image and a ground image, respectively, additionally separate a second foreground between a first foreground, i.e., an object designated by a user, and a background from the source frame based on geodesic distances for the pixels of the frame on which color correction has been performed, and combine the separated first and second foregrounds with the target frame, thereby generating a natural, synthesized image in real time.

BACKGROUND ART

Recently, in movies, commercial advertisements, or the like, images are generated using various special techniques in order to provide more splendid images.

A technology of synthesizing two or more images into a single image is the most widely used of the special techniques.

This image synthesis is commonly performed by selecting a region, desired for synthesis by a user, from a source image and combining a foreground, i.e., the selected region, with a ground image. However, this technology is problematic in that an image synthesized by the above-described method is not natural due to an abrupt change in pixel value in a boundary portion attributable to the difference in brightness, color, or the like between a source image and a ground image.

Accordingly, Korean Patent Application Publication No. 10-2013-0123820 relates to a real-time image synthesis apparatus and method, which are configured to, when a background image is determined in response to a user selection signal, determine a region and a location with which a user image is to be combined on a background image, extract a real-time appearance of a user via a camera, combine the extracted real-time appearance of the user with the determined background image by means of a mixing or masking method, and provide a synthesized image. However, the technology disclosed in this published patent document cannot overcome the above-described problem.

Accordingly, there is a need for a technology that is capable of overcoming the above-described problem.

Meanwhile, the above-described background art corresponds to technical information which has been possessed by the present inventor in order to conceive the present invention or which has been acquired in the process of conceiving the present invention, and is not necessarily considered to be a well-known technology that had been known to the public before the filing date of the present invention.

DISCLOSURE

Technical Problem

An object of an embodiment of the present invention is to separate a source image into a first foreground, i.e., an object selected by a user, and a background in order to combine two images, additionally separate a second foreground, i.e., a region of the ones of the pixels of the source image for which the geodesic distances to the first foreground and the background are similar, from the source image, and combine the first and second foregrounds with a ground image, thereby generating a natural image.

Furthermore, an object of an embodiment of the present invention is to combine a second foreground, additionally extracted from a source image, with a ground image, thereby correcting the colors of the pixels of the second foreground based on the pixels of the ground image at locations where pixels included in the second foreground are to be combined and, thus, providing a more natural synthesized image.

Technical Solution

As a technical solution for solving at least one of the above technical problems, according to a first aspect of the present invention, there is provided an image synthesis system for providing a method for image synthesis, the system including: a first foreground unit configured to receive a predetermined region that is selected from a source image including an object, which is a target for the image synthesis, as a first foreground by a user; a similarity determination unit configured to calculate the similarity between each of the first foreground and the background distinct from the first foreground on the source image and each pixel included in the source image; a second foreground unit configured to determine a second foreground, including the remaining pixels excluding pixels, included in each of the first foreground and the background, from the source image, based on the similarity calculated by the similarity determination unit; and an image synthesis unit configured to combine the first foreground and the second foreground with a ground image, which is an image with which the first foreground is to be combined; wherein the similarity determination unit generates a foreground mask having binary values for pixels belonging to the first foreground, generates a background mask having binary values for pixels belonging to the background, and calculates the similarity of each pixel included in the source image by calculating a geodesic distance between a binary value belonging to each of the foreground mask and the background mask and the pixel included in the source image.

According to a second aspect of the present invention, there is provided an image synthesis method by which an image synthesis system performs image synthesis, the method including: receiving a predetermined region that is selected from a source image including an object, which is a target for the image synthesis, as a first foreground by a user; calculating the similarity between each of the first foreground and the background distinct from the first foreground on the source image and each pixel included in the source image; determining a second foreground, including the remaining pixels excluding pixels, included in each of the first foreground and the background, from the source image, based on the calculated similarity; and combining the first foreground and the second foreground with a ground image, which is an image with which the first foreground is to be combined; wherein calculating the similarity includes: generating a foreground mask having binary values for pixels belonging to the first foreground; generating a background mask having binary values for pixels belonging to the background; and calculating the similarity of each pixel included in the source image by calculating a geodesic distance between a binary value belonging to each of the foreground mask and the background mask and each pixel included in the source image.

Advantageous Effects

According to any one of the above-described technical solutions, an embodiment of the present invention is configured to separate a source image into a first foreground, i.e., an object selected by a user, and a background in order to combine two images, additionally separate a second foreground, i.e., a region of the ones of the pixels of the source image for which the geodesic distances to the first foreground and the background are similar, from the source image, and combine the first and second foregrounds with a ground image, thereby generating a natural image.

Furthermore, according to any one of the above-described technical solutions, a second foreground, additionally extracted from a source image, is combined with a ground image, and thus the colors of the pixels of the second foreground are corrected based on the pixels of the ground image at locations where pixels included in the second foreground are to be combined, thereby providing a more natural synthesized image.

Moreover, correction values for color correction are calculated using a method of calculating an optimal multi-dimensional curved surface equation in order to perform color correction between a second foreground and a ground image, thereby performing real-time image synthesis.

The effects that can be obtained in the present invention are not limited to the above-described effects, and other effects that have not been described will be clearly understood from the following description by those having ordinary knowledge in the art to which the present invention pertains.

MODE FOR INVENTION

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, parts unrelated to descriptions are omitted in order to clearly describe the present invention, and similar reference symbols are assigned to similar components throughout the specification.

Throughout the specification, when a part is described as being "connected" to another part, this includes not only a case where they are "directly connected" to each other but also a case where they are "electrically connected" to each other with another element interposed therebetween. Furthermore, when a part is described as "including" a component, this means that another component is not be excluded from the part but may be included in the part, unless particularly described to the contrary.

The present invention will be described in detail with reference to the accompanying drawings below.

Prior to the following description, the meanings of the terms used herein will be defined first.

In the present invention, the "first foreground" is an image that is a target for image synthesis, and may be, for example, an image including a specific object included in an image or including an object, such as a region selected by a user. An image including such an object image is referred to as a "source image."

Furthermore, the "ground image" is a target image with which a first foreground is to be combined. The ground image may be an image that is identical to or different from a source image.

The "second foreground" is a region that is distinct from a first foreground and the background of a source image including the first foreground. For example, the "second foreground" refers to a region of a boundary portion between an object, selected by a user for the purpose of performing image synthesis, and a background, such as spray when a dolphin breaks the surface of water, smoke from a chimney, or the like.

The "mask" is a filter for extracting the values of a specific region, such as a first foreground or a background, selected by a user, and is composed of binary values, i.e., pixels each having 0 or 1.

Furthermore, a mask for a first foreground is referred to as a "foreground mask," and a mask for a background is referred to as a "background mask."

The "image geodesic distance transform" is obtained by calculating the shortest geodesic distance from each pixel of an input image to a mask when the input image and a mask image are given. Using this, how far each pixel is spaced apart from the mask can be found.

Figure 1:
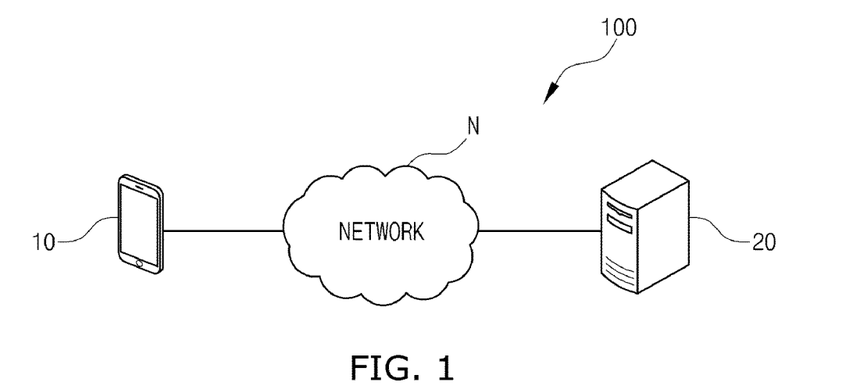
FIG. 1 is a diagram showing the configuration of an image synthesis system according to an embodiment of the present invention.

FIG. 1 is a diagram illustrating the configuration of an image synthesis system 100 according to an embodiment of the present invention.

A network N over which components of the image synthesis system 100 communicate may be implemented using one or more of all types of wired/wireless networks, such as a Local Area Network (LAN), a Wide Area Network (WAN), a Value Added Network (VAN), a Personal Area Network (PAN), a mobile radio communication network, the Wireless Broadband (Wibro) Internet, a Mobile Worldwide Interoperability for Microwave Access (mobile WiMAX) network, a High Speed Downlink Packet Access (HSDPA) network, a satellite communication network, etc.

A user terminal 10 may be implemented using a computer, a portable terminal, a television, or a wearable device that can access a remote server or be connected to another terminal and a server over the network N. In this case, the computer includes, for example, a notebook, a desktop, and a laptop each equipped with a web browser. The portable terminal is, for example, a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, etc. Furthermore, the television may include an Internet Protocol Television (IPTV), an Internet Television (Internet TV), a terrestrial TV, a cable TV, etc. Moreover, the wearable device is an information processing device of a type that can be directly worn on a human body, such as a watch, glasses, an accessory, clothing, shoes, or the like, and can access a remote server or be connected to another terminal directly or via another information processing device over a network.

The user terminal 10 may download a client for providing a user interface for image synthesis to a user over the network N, and a downloaded client may be installed on the user terminal 10.

Furthermore, a source image may be received over the network N via the client installed on the user terminal 10, a specific region may be selected from the received source image as a first foreground, and information about the region for the selected first foreground may be transmitted to an image synthesis server 20 to be described below.

Meanwhile, the image synthesis server 20 may be implemented using a general-purpose computer capable of communicating over the network N. The image synthesis server 20 may include a storage medium for storing predetermined information, or may store information by means of a third server that is operated by a third party.

Furthermore, the image synthesis server 20 may provide the client directly to the user terminal 10, or may provide a message including URL information so that the user terminal 10 can download the client via the third server.

The image synthesis server 20 may determine a second foreground region by means of an image geodesic distance transform based on the first foreground, selected by the user, and a background, and may correct the difference in color between the source image and a ground image.

Furthermore, the image synthesis server 20 may combine the first foreground and the second foreground with the ground image selected by the user.

Meanwhile, a part or all of the functions that are performed for the image synthesis that is performed by the image synthesis system 100 may be performed in the user terminal 10 or in the image synthesis server 20 depending on an embodiment.

To describe the image synthesis system 100, the individual components of the image synthesis system 100 will be described with reference to FIG. 2 below.

First, the image storage unit 210 of the image synthesis system 100 may store a source image and a ground image, i.e., targets for image synthesis, or may receive an image stored in the third server.

Furthermore, the image storage unit 210 may provide at least one stored image to a user in response to a request from the user.

A first foreground unit 220 may receive a predetermined region that is selected from the source image, including an object, i.e., a target for the image synthesis, as a first foreground by the user.

In other words, the first foreground unit 220 may receive a specific region selected from a source image, provided by the image storage unit 210, by the user, and may determine the selected region to be a first foreground.

For example, the first foreground unit 220 may receive a specific region that is selected from each frame, included in the source image, as a first foreground by the user via a user interface that is provided to the user.

Alternatively, for example, the first foreground unit 220 may receive a specific region of a single frame selected as the first foreground by the user, may track a region, having the same pixel value as the selected first foreground, in another frame included in the source image, and may determine the tracked region to be a first foreground.

Furthermore, in one embodiment, the first foreground unit 220 may determine a region of the pixels, whose pixel value change is equal to or smaller than a predetermined value in the remaining region excluding the first foreground, to be a background, or may receive a background selected by the user.

For example, the first foreground unit 220 may calculate changes in pixel value between frames for the pixels of the remaining region, excluding the first foreground, with respect to each frame included in the source image, and may determine a region, in which the change in pixel value is equal to or smaller than a predetermined value, to be a background.

Furthermore, the similarity determination unit 230 may calculate the similarity between each of the first foreground and the background distinct from the first foreground of the source image and each pixel included in the source image.

To calculate such similarity, the similarity determination unit 230 may use an image geodesic distance transform.

In other words, the similarity determination unit 230 may represent the locations of two pixels on an image by using a time axis representative of a change in frame and X and Y axes in each two-dimensional frame. Based on this representation, the similarity determination unit 230 may obtain the distance between pixels at two points on an image by means of a geodesic distance transform used to obtain the distance between two points on a three-dimensional curved surface.

An image geodesic distance transform equation for the obtainment of the distance is as follows:

$$d(a, b) = \inf_{\Gamma \in P_{a,b}} \int_0^{l(\Gamma)} \sqrt{1 + \gamma^2 (\nabla I \cdot \Gamma'(s))^2} \, ds$$

where:
  d(a, b): the geodesic distance between points a and b of frame I;
  $P_{a,b}$: all the paths between points a and b, and Γ: the path between points a and b;
  Γ(s): a length on a curved surface represented by parameter s (s∈[0,l(Γ)];
  Γ'(s)=∂Γ/∂s: a unit vector tangent in the direction of the path; and
  γ: a weight for ∇I (a change in frame)

Using the geodesic distance between the two pixels, the similarity determination unit 230 may calculate the distance from each pixel included in the source image to each of the first foreground and the background.

In this case, the similarity determination unit 230 may use a mask having binary values in order to obtain the geodesic distance between a pixel, included in an image, and a specific region at low complexity.

This may be represented by the following equation:

$$D(x; M, \nabla I) = \min_{\{x' | M(x') = 0\}} d(x, x')$$

where:
  M: a mask; and
  D(x; M, ∇I): the minimum geodesic distance from each pixel of the mask to pixel x within the image.

In other words, the similarity determination unit 230 may use a foreground mask and a background mask used for the first foreground and the background, respectively, in order to obtain the geodesic distances from the boundary of each of the first foreground and the background to each pixel of the source image.

In this case, the foreground mask $M_f(x)$ and the background mask $M_b(x)$ are represented by the following equations:

$$M_f(x) = \begin{cases} 0, & x \in \Omega_f \\ 1, & \text{otherwise} \end{cases}, \quad M_b(x) = \begin{cases} 0, & x \in \Omega_b \\ 1, & \text{otherwise} \end{cases}$$

where $\Omega_f$: a pixel included in the first foreground, and $\Omega_b$: a pixel included in the background.

Furthermore, the similarity determination unit 230 may calculate the geodesic distances from the boundaries of the foreground mask and the background mask based on each pixel of the source image.

These geodesic distances are represented by symbols as follows:

$D_f(x)$: the geodesic distance from the pixel x to the boundary of the first foreground; and $D_b(x)$: the geodesic distance from the pixel x to the boundary of the background Thereafter, a second foreground unit 240 may determine a second foreground that includes the remaining pixels excluding pixels, included in the first foreground and the background, from the source image.

In one embodiment, the second foreground unit 240 may determine a region of the pixels, for which the difference in geodesic distance is equal to or smaller than a predetermined value, to be the second foreground by means of the difference between the geodesic distance from the pixel x to the first foreground and the geodesic distance from the pixel x to the background, based on the geodesic distances from each pixel of the source image to the first foreground and the background, which are obtained by the similarity determination unit 230.

Furthermore, a color correction unit 250 may correct the differences in color between the source image and the ground image by correcting pixel values included in the source image by means of the differences between the pixel values of the source image and the pixel values of the ground image corresponding to the locations of the respective pixels of the source image.

For this purpose, color correction has been performed using the Poisson equation. In contrast, the color correction unit 250 of the present invention may avoid the use of the Poisson equation by means of the first foreground and the second foreground having flexible boundaries.

In other words, the color correction unit 250 may calculate correction values that can minimize the differences in color between the second foreground and the ground image, and may correct the colors of the pixels included in the second foreground by incorporating the correction values into the source image.

In this case, the value of each pixel included in the frame may be separated to R, G, and B values and then represented, as in $I=[I_r, I_g, I_b]$.

An equation for the color correction that is performed by the color correction unit 250 as described above is as follows:

$L(I(x, y)) = I(x, y) + P(x, y)$ (correction equation) where:

$J(x, y)$: a pixel of the ground image;

$I(x, y)$: the pixel of the source image that is superimposed on $J(x, y)$ based on the image synthesis; and $P(x, y)$: a correction value.

In other words, the color correction may be performed by adding $P(x, y)$ to the pixel of the source image, and $P(x, y)$ may be represented by a polynomial function for coordinates.

Assuming that $P(x, y)$ is an nth degree function, it may be represented as follows:

$$P(x, y) = \begin{bmatrix} \sum_{i=0}^{n-j} \sum_{j=0}^{n} a_r^{(i,j)} x^i y^j \\ \sum_{i=0}^{n-j} \sum_{j=0}^{n} a_g^{(i,j)} x^i y^j \\ \sum_{i=0}^{n-j} \sum_{j=0}^{n} a_b^{(i,j)} x^i y^j \end{bmatrix}$$

The value of $P(x, y)$ may be obtained by obtaining $P(x, y)$ that minimizes an error function, such as that shown below.

$O = \sum_{(x,y)} \omega_s(x, y)(I(x, y) + P(x, y) - J(x, y))^2$ (error function)

where $\omega_s(x, y)$: a second foreground weight using the probability that a pixel corresponding to coordinates $(x, y)$ of the source image belongs to the second foreground.

In this case, assuming that $P(x, y)$ included in the error function is a quadratic function, the error function may be solved as follows:

$$O_r = \sum_{(x,y)} \omega_S(x, y) \begin{pmatrix} a_r^{(2,0)} x^2 + a_r^{(1,1)} xy + a_r^{(0,2)} y^2 + \\ a_r^{(1,0)} x + a_r^{(0,1)} y + a_r^{(0,0)} + I(x, y) - J(x, y) \end{pmatrix}^2$$

The above function represents a solution for R of the pixel values, and is re-solved as follows:

$$\frac{\partial O_r}{\partial a} =$$

$$\sum_{(x,y)} \omega_S(x, y) \begin{bmatrix} x^2 \\ xy \\ y^2 \\ x \\ y \\ 1 \end{bmatrix} \begin{bmatrix} x^2 \\ xy \\ y^2 \\ x \\ y \\ 1 \end{bmatrix}^T \begin{bmatrix} a_r^{(2,0)} \\ a_r^{(1,1)} \\ a_r^{(0,2)} \\ a_r^{(1,0)} \\ a_r^{(0,1)} \\ a_r^{(0,0)} \end{bmatrix} - \sum_{(x,y)} \omega_S(x, y)(J(x, y) - I(x, y)) \begin{bmatrix} x^2 \\ xy \\ y^2 \\ x \\ y \\ 1 \end{bmatrix}$$

This is rearranged as follows:

$$\begin{bmatrix} a_r^{(2,0)} \\ a_r^{(1,1)} \\ a_r^{(0,2)} \\ a_r^{(1,0)} \\ a_r^{(0,1)} \\ a_r^{(0,0)} \end{bmatrix} =$$

$$\left(\sum_{(x,y)} \omega_S(x,y) \begin{bmatrix} x^2 \\ xy \\ y^2 \\ x \\ y \\ 1 \end{bmatrix} \begin{bmatrix} x^2 \\ xy \\ y^2 \\ x \\ y \\ 1 \end{bmatrix}^T \right)^{-1} \sum_{(x,y)} \omega_S(x,y)(J(x,y)-I(x,y)) \begin{bmatrix} x^2 \\ xy \\ y^2 \\ x \\ y \\ 1 \end{bmatrix}$$

Accordingly, assuming that P(x, y) is an nth degree function, the above matrix becomes an (n+1) (n+2)/2-dimension matrix.

When recursive optimization is performed in such a manner that zero-dimensional coefficients are calculated first and one-dimensional coefficients are calculated for the rest, the error function may be expressed by a recurrence equation as follows:

$$a_n = [a^{(n,0)}, a^{(n-1,1)} \ldots a^{(0,n)}]^T$$

$$x_n = [x^n y^0, x^{n-1} y^1 \ldots x^0 y^n]^T$$

$$R_{-1}(x, y) = J(x, y) - I(x, y)$$

$$R_{n+1}(x, y) = R^n(x, y) - (x_n)^T a_n$$

$$O_n = \sum_{(x,y)} \omega_S(x,y)((x_n)^T a_n - R_{n-1}(x,y))^2$$

This is rearranged as follows:

$$a_n = \left(\sum_{(x,y)} \omega_S(x,y)(x_n)^T x_n\right)^{-1} \sum_{(x,y)} \omega_S(x,y) R_{n-1}(x,y)$$

When calculation is recursively performed from a zero dimension by using the above equation, an nth degree polynomial function may be calculated via (n+1) optimizations, via which the correction value P(x, y), i.e., an nth degree polynomial function, may be calculated.

In this method, the color correction unit 250 may calculate correction values adapted to correct the colors of pixels included in the source image, and may correct the colors of the pixels of the source image.

Furthermore, an image synthesis unit 260 may combine the first foreground and the second foreground with the ground image, i.e., an image with which the first foreground is to be combined.

For this purpose, the image synthesis unit 260 may calculate the probability that each pixel belongs to the first foreground, the second foreground, or the background based on the geodesic distances of each pixel calculated by the similarity determination unit 230.

$$P_f(x) = \exp(-0.5\alpha |D_f^n(x)|^2)$$

$$P_b(x) = \exp(-0.5\alpha |D_b^n(x)|^2)$$

$$P_s(x) = \exp(-0.5\alpha D_f^n(x) - D_b^n(x)|^{2\beta})$$

where α is a parameter adapted to control the clarity of boundaries dividing the regions of the first foreground, the second foreground and the background, and β is a parameter adapted to determine the extension of the range of the second foreground.

According to the above equations, it can be seen that as the difference between the geodesic distance from the pixel x to the boundary of the first foreground and the geodesic distance from the pixel x to the boundary of the background becomes smaller, the probability that the pixel x belongs to the second foreground increases, but the probability that the pixel x belongs to the first foreground or background decreases.

Thereafter, the image synthesis unit 260 may calculate a weight for the first foreground, second foreground or background based on the above-described probability that the pixel x belongs to the first foreground, second foreground or background, which is expressed by equations as follows:

$$\omega_f = P_f(x)/P(x)$$

$$\omega_b = P_b(x)/P(x)$$

$$\omega_s = P_s(x)/P(x)$$

where $P(x) = P_f(x) + P_b(x) + P_s(x)$.

Furthermore, the image synthesis unit 260 may combine the first and second foregrounds of the source image with the ground image for each frame according to the following equation by using the calculated weights for the first foreground, the second foreground, and the background:

$$C = \omega_f I + (\omega_b + (1-\sigma)\omega_s) J + \sigma \omega_s L(I)$$

where:

C: a synthesized frame, and I: a frame included in the source image; and

J: a frame included in the ground image, and L(I): I whose colors have been corrected.

As can be seen from the above equation, the image synthesis unit 260 may extract pixel values for the first foreground and the second foreground, whose colors have been corrected, from the source image by using the weights for the first foreground, the second foreground and the background, may extract pixels, which is to become a background for a synthesized image, from the ground image by using the weight for the background, and may perform the synthesis of a single image.

In this case, the image synthesis unit 260 may use an alpha value, i.e., a transparency value, as a weight for linear interpolation when combining the second foreground and the ground image with each other, and may determine the levels of incorporation of the pixel values of the second foreground and the ground image by controlling the alpha values of the second foreground and the ground image.

This enables the boundary, at which the second foreground and the ground image are combined, to be naturally represented.

Meanwhile, when the colors of the first foreground are inappropriate because the brightness of the source image is different from the brightness of the ground image, the image synthesis unit 260 may generate a new source image into which pixels, included in the source image whose colors have been corrected by the color correction unit 250, and pixels, included in the source image whose colors have not been corrected, have been incorporated at a predetermined ratio.

In other words, the image synthesis unit 260 may newly generate a source image, whose brightness has been controlled, according to the following equation:

$$I' = \lambda I + (1-\lambda) L(I)$$

where λ: the ratio of incorporation provided by the user.

In other words, the image synthesis unit 260 may generate the source image, whose brightness has been controlled, by applying linear interpolation to the source image whose colors have been corrected based on the ground image and the source image whose colors have not been corrected.

Figure 2:
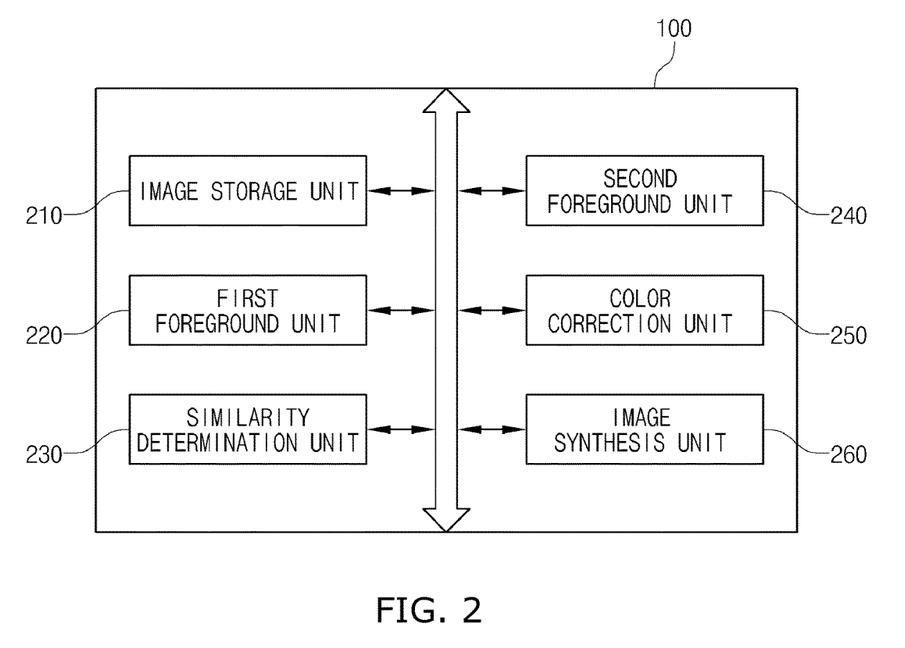
FIG. 2 is a block diagram showing the configuration of an image synthesis system according to an embodiment of the present invention.
Figure 3:
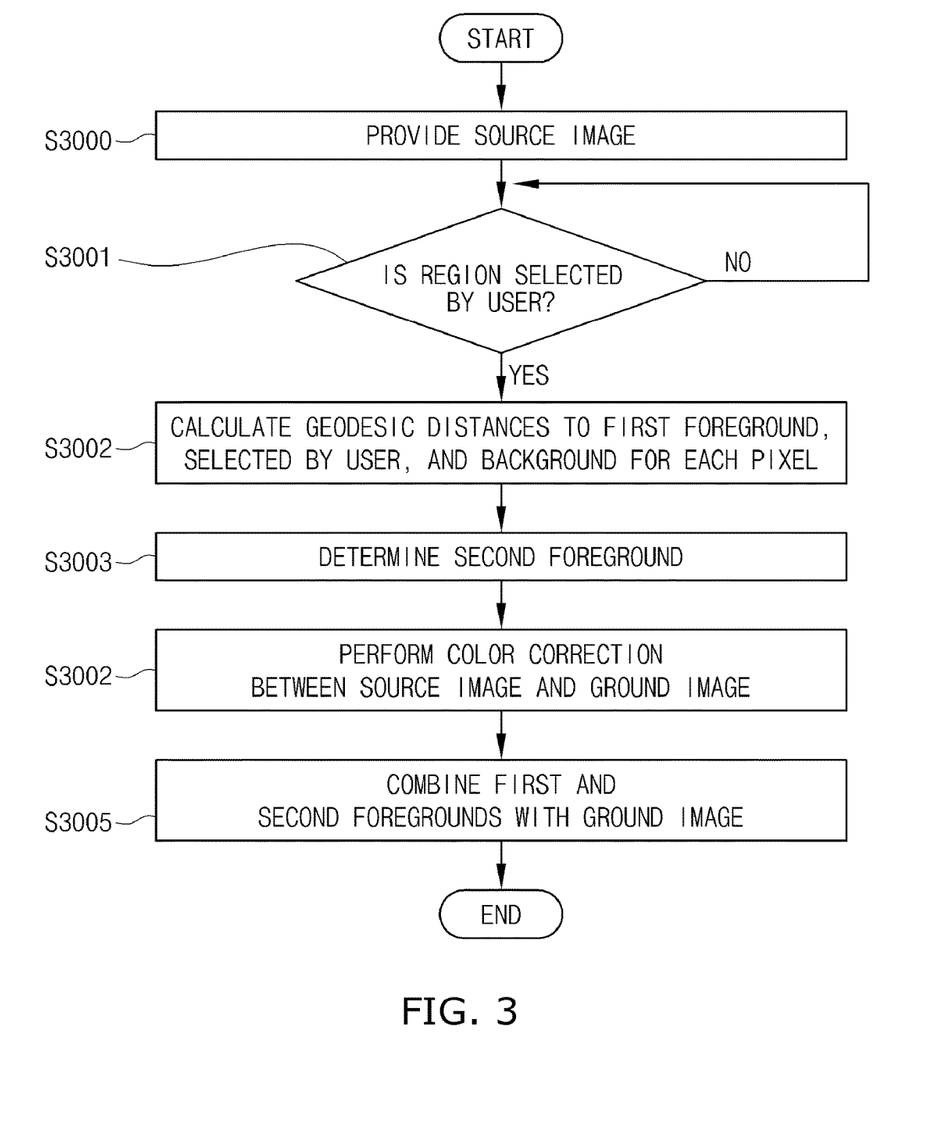
FIG. 3 is a flowchart illustrating an image synthesis method according to an embodiment of the present invention.

An image synthesis method according to the embodiment shown in FIG. 3 includes steps that are performed in time sequence by the image synthesis system 100 shown in FIG. 2. Accordingly, the items that are omitted below but have been described above in conjunction with the image synthesis system 100 shown in FIG. 2 may be also applied to the image synthesis method according to the embodiment shown in FIG. 3.

First, at step S3000, the image synthesis system 100 may provide at least one image to a user as a source image or ground image for image synthesis.

In an embodiment, the image synthesis system 100 may provide an image stored in the image synthesis system 100 to the user, or may receive an image stored in a third server and provide the image to the user.

Furthermore, at step S3001, the image synthesis system 100 monitors whether the user has selected a part or all of a predetermined region from the source image including an object, i.e., a target for image synthesis, as a first foreground, and may determine the region selected by the user to be the first foreground.

In this case, the image synthesis system 100 may determine a background for the first foreground selected by the user and included in the source image.

For example, the image synthesis system 100 may request the user to select a background from a region excluding the first foreground, and may receive a background selected by the user.

Alternatively, for example, the image synthesis system 100 allows a region, including pixels whose pixel values do not change between frames in the remaining region excluding the first foreground, to be selected as a background.

Thereafter, at step S3002, the image synthesis system 100 may determine a second foreground, including the remaining pixels exclusive of pixels included in each of the first foreground and the background, in the source image.

For this purpose, the image synthesis system 100 may calculate the minimum geodesic distances to the first foreground and the background for each pixel included in the source image.

In this case, to reduce complexity and determine a clear second foreground, the image synthesis system 100 may use a mask that has the same region as the first foreground and the background and has pixel values of 0 and 1.

For example, the image synthesis system 100 may calculate the geodesic distance between each pixel of the source image and the boundary of a foreground mask by using the foreground mask, i.e., a mask in which the pixel value of a region corresponding to the first foreground is 0 and the remaining region has a pixel value of 1.

Furthermore, for example, the image synthesis system 100 may calculate the geodesic distance between each pixel of the source image and the boundary of a background mask by using the background mask, i.e., a mask in which the pixel value of a region corresponding to the background is 0 and the remaining region has a pixel value of 1.

Thereafter, at step S3003, the image synthesis system 100 may determine the second foreground based on the geodesic distances to the first foreground and the background for each pixel of the source image.

In other words, the image synthesis system 100 may determine each pixel to be a pixel corresponding to the second foreground when the difference between the geodesic distance to the first foreground and the geodesic distance to the background for each pixel of the source image is equal to or smaller than a predetermined value.

Furthermore, at step S3004, the image synthesis system 100 may correct each pixel value included in the source image by using the difference between the pixel value of the source image and the pixel value of the ground image corresponding to the location of each pixel of the source image.

In other words, the image synthesis system 100 may perform color correction between the second foreground with which the ground image is to be combined and the pixels of the ground image at locations where the second foreground is to be combined, thereby enabling the combined second foreground and ground image to be naturally viewed without being separately viewed.

Thereafter, at step S3005, the image synthesis system 100 may combine the first foreground, the second foreground whose colors have been corrected, and the ground image.

In other words, the image synthesis system 100 may take into account not only the first foreground and the ground but also the second foreground whose colors have been corrected at step S3004 for the purpose of performing image synthesis, and may control the ratio of incorporation of pixel values between the second foreground and the ground image by using the alpha values of pixels when the second foreground and the ground image are combined.

Meanwhile, in one embodiment, when the brightness of the source image is different from the brightness of the ground image and thus the colors of the first foreground are inappropriate, the image synthesis system 100 may generate a new source image into which pixels included in the source image whose colors have been corrected and pixels included in the source image whose colors have not been corrected have been incorporated at a predetermined ratio according to step S3004.

The image synthesis method according to the embodiment described via FIG. 3 may be implemented in the form of a storage medium including computer-executable instructions, such as a computer-executable program module. The computer-readable medium may be any computer-accessible available medium, and includes all volatile and nonvolatile media and separable and non-separable media. Furthermore, the computer-readable medium may include all computer storage media and communication media. The computer storage medium includes volatile, nonvolatile, separable and non-separable media that are intended to store information, such as computer-readable instructions, a data structure, a program module or another type of data, and that is implemented using an arbitrary method or technology. The communication medium typically includes computer-readable instructions, a data structure, a program module, or the data of a modulated data signal such as a carrier, or another type of transmission mechanism, and includes any information transfer medium.

Furthermore, the image synthesis method according to an embodiment of the present invention may be implemented as a computer program (or a computer program product) in computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the image synthesis method according to an embodiment of the present invention may be implemented in such a way that a computer program, such as that described above, is executed by a computing device. The computing device may include at least part of a processor, memory, a storage device, a high-speed interface accessing the memory and a high-speed expansion port, and a low-speed interface accessing a low-speed bus and a storage device. These components are connected to each other by using various buses, and may be mounted on a common mother board or using another appropriate method.

In this case, the processor may process instructions in a computing device. These instructions may be instructions that are stored in memory or a storage device and are used to display graphic information adapted to provide a graphic user interface (GUI) to an external input/output device, for example, a display connected to a high-speed interface. As another embodiment, a plurality of processors and/or a plurality of buses may be appropriately used along with a plurality of pieces of memory and memory forms. Furthermore, the processor may be implemented as a chip set including chips including a plurality of independent analog and or digital processors.

Furthermore, the memory stores information in a computing device. As an example, the memory may be composed of a volatile memory unit or a set of volatile memory units. As another example, the memory may be composed of a nonvolatile memory unit or a set of nonvolatile memory units. Furthermore, the memory may be, for example, another type of computer-readable medium, such as a magnetic or optical disk.

Furthermore, the storage device may provide a large-sized storage space to a computing device. The storage device may be a computer-readable medium or a configuration including such a medium. For example, the storage device may include devices included in a storage area network (SAN), or may include another component. The storage device may be a floppy disk device, a hard disk device, an optical disk device, a tape device, flash memory, or another semiconductor memory device or device array similar thereto.

The foregoing description of the present invention is merely illustrative, and it will be understood by those having ordinary knowledge in the art to which the present invention pertains that modifications and variations can be easily made without departing from the technical spirit and essential features of the present invention. Therefore, it should be appreciated that the above-described embodiments are illustrative in all aspects but are not limitative. For example, each component that is described as being in a single form may be practiced in a distributed form. In the same manner, components that are described as being in a distributed form may be practiced in an integrated form.

The scope of the present invention is defined by the attached claims, rather than the detailed description. Furthermore, all modifications and variations derived from the meanings, scope and equivalents of the claims should be construed as falling within the scope of the present invention.

The invention claimed is:

1. An image synthesis system for providing a method for image synthesis, the system comprising:
a first foreground unit configured to receive a predetermined region that is selected from a source image including an object, which is a target for the image synthesis, as a first foreground by a user;
a similarity determination unit configured to calculate a similarity between each of the first foreground and a background distinct from the first foreground on the source image and each pixel included in the source image;
a second foreground unit configured to determine a second foreground, including remaining pixels excluding pixels, included in each of the first foreground and the background, from the source image, based on the similarity calculated by the similarity determination unit; and
an image synthesis unit configured to combine the first foreground and the second foreground with a ground image, which is an image with which the first foreground is to be combined;
wherein the similarity determination unit generates a foreground mask having binary values for pixels belonging to the first foreground, generates a background mask having binary values for pixels belonging to the background, and calculates a similarity of each pixel included in the source image by calculating a geodesic distance between a binary value belonging to each of the foreground mask and the background mask and the pixel included in the source image.

2. The image synthesis system of claim 1, wherein the second foreground unit selects a pixel for which a difference between a geodesic distance from a boundary pixel of the foreground mask and a geodesic distance from a boundary pixel of the background mask is equal to or smaller than a predetermined value with respect to each pixel included in the source image, and determines a region, including only the selected pixels, to be the second foreground.

3. The image synthesis system of claim 1, further comprising a color correction unit configured to correct each pixel value included in the source image by using a difference between each pixel value of the source image and a pixel value of the ground image corresponding to a location of each pixel of the source image.

4. The image synthesis system of claim 3, wherein the color correction unit calculates a correction value for each pixel value of the second foreground by using a difference between a pixel value of the ground image corresponding to a location of each pixel of the second foreground and a corresponding pixel value of the second foreground and also using an error function.

5. The image synthesis system of claim 4, wherein the color correction unit repeatedly calculates a correction value for a pixel value of the second foreground, corrected based on the former correction value, by using a difference between the corrected pixel value of the second foreground and the pixel value of the ground image and also using the error function so that the difference between the corrected pixel value of the second foreground and the pixel value of the ground image is minimized.

6. The image synthesis system of claim 3, wherein the image synthesis unit, when combining the second foreground and the ground image, combines the second foreground and the ground image based on a combination ratio representative of a ratio of incorporation between pixels of the ground image corresponding to locations where the second foreground is to be combined on the ground image and pixels of the second foreground whose pixel values have been corrected by the color correction unit.

7. The image synthesis system of claim 1, further comprising an image storage unit configured to store at least one of the source image and the ground image for the image synthesis.

8. An image synthesis method by which an image synthesis system performs image synthesis, the method comprising:
- receiving a predetermined region that is selected from a source image including an object, which is a target for the image synthesis, as a first foreground by a user;
- calculating a similarity between each of the first foreground and a background distinct from the first foreground on the source image and each pixel included in the source image;
- determining a second foreground, including remaining pixels excluding pixels, included in each of the first foreground and the background, from the source image, based on the calculated similarity; and
- combining the first foreground and the second foreground with a ground image, which is an image with which the first foreground is to be combined;

wherein calculating the similarity comprises:
- generating a foreground mask having binary values for pixels belonging to the first foreground;
- generating a background mask having binary values for pixels belonging to the background; and
- calculating a similarity of each pixel included in the source image by calculating a geodesic distance between a binary value belonging to each of the foreground mask and the background mask and each pixel included in the source image.

9. The image synthesis method of claim 8, wherein determining the second foreground comprises:
- selecting a pixel for which a difference between a geodesic distance from each of a boundary pixel of the foreground mask and a geodesic distance from a boundary pixel of the background mask is equal to or smaller than a predetermined value with respect to each pixel included in the source image; and
- determining a region, including only the selected pixels, to be the second foreground.

10. The image synthesis method of claim 8, wherein combining the first foreground and the second foreground with the ground image comprises correcting each pixel value included in the source image by using a difference between each pixel value of the source image and a pixel value of the ground image corresponding to a location of each pixel of the source image.

11. The image synthesis method of claim 10, wherein correcting each pixel value comprises calculating a correction value for each pixel value of the second foreground by using a difference between a pixel value of the ground image corresponding to a location of each pixel of the second foreground and a corresponding pixel value of the second foreground and also using an error function.

12. The image synthesis method of claim 11, wherein calculating the correction value comprises repeatedly calculating a correction value for a pixel value of the second foreground, corrected based on the former correction value, by using a difference between the corrected pixel value of the second foreground and the pixel value of the ground image and also using the error function so that the difference between the corrected pixel value of the second foreground and the pixel value of the ground image is minimized.

13. The image synthesis method of claim 10, wherein combining the first foreground and the second foreground comprises, when combining the second foreground and the ground image, combining the second foreground and the ground image based on a combination ratio representative of a ratio of incorporation between pixels of the ground image corresponding to locations where the second foreground is to be combined on the ground image and pixels of the second foreground whose pixel values have been corrected.

14. A computer program configured to be executed by a computer device and stored in a storage medium to perform the method set forth in claim 8.

* * * * *